United States Patent Office 3,687,834
Patented Aug. 29, 1972

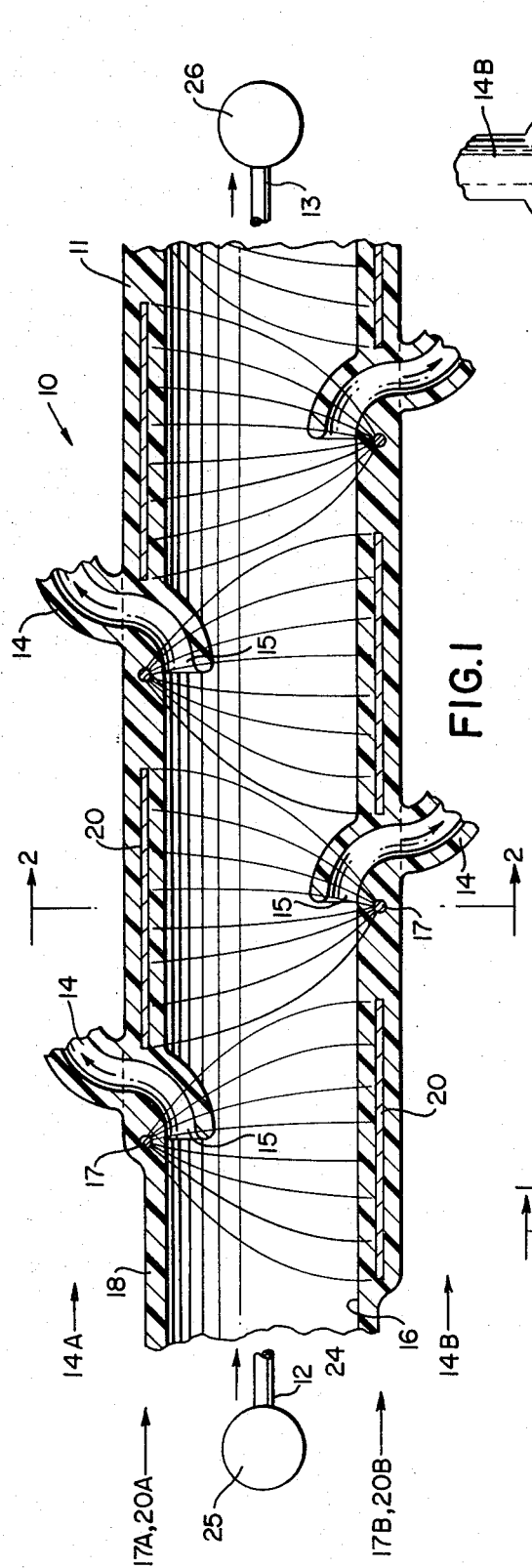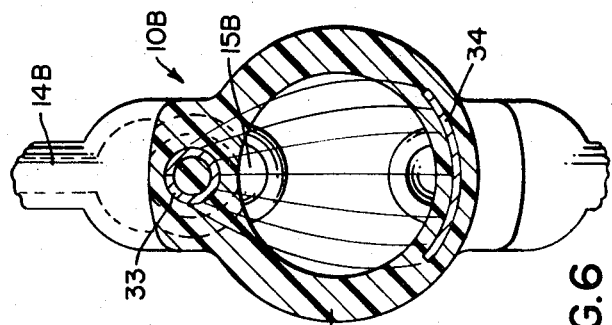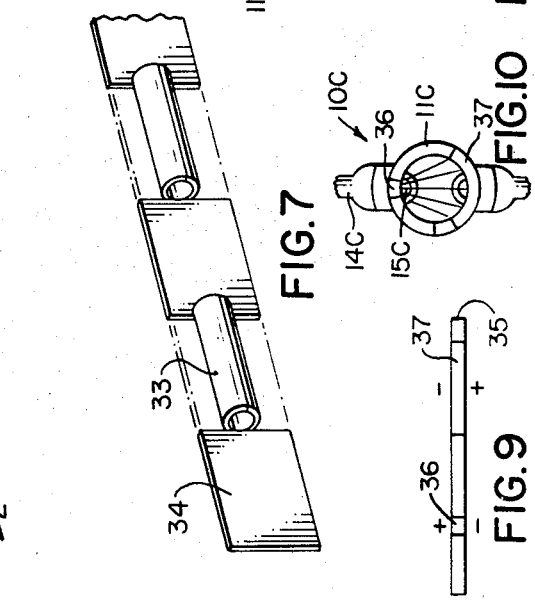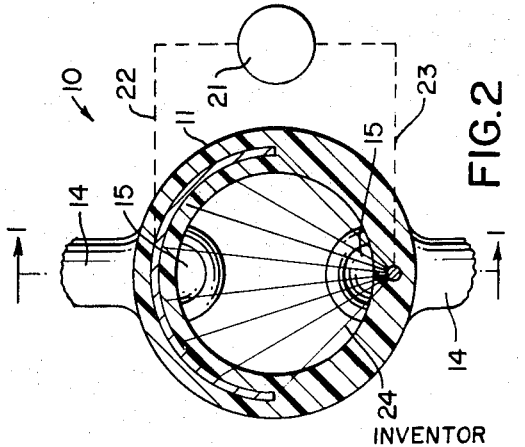
INVENTOR
JAMES T. CANDOR
HIS ATTORNEYS

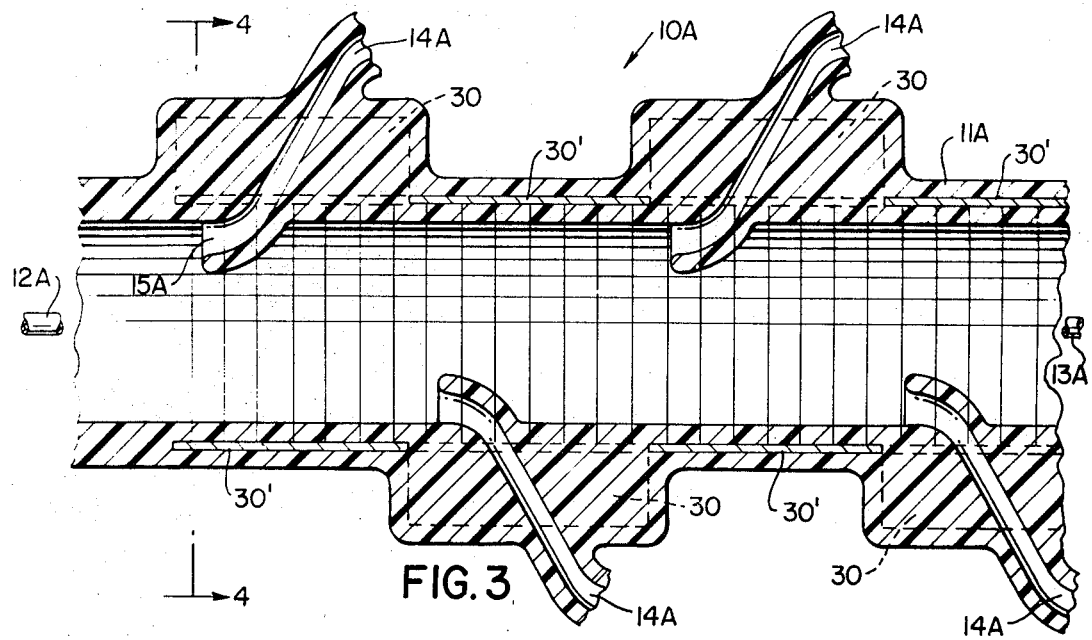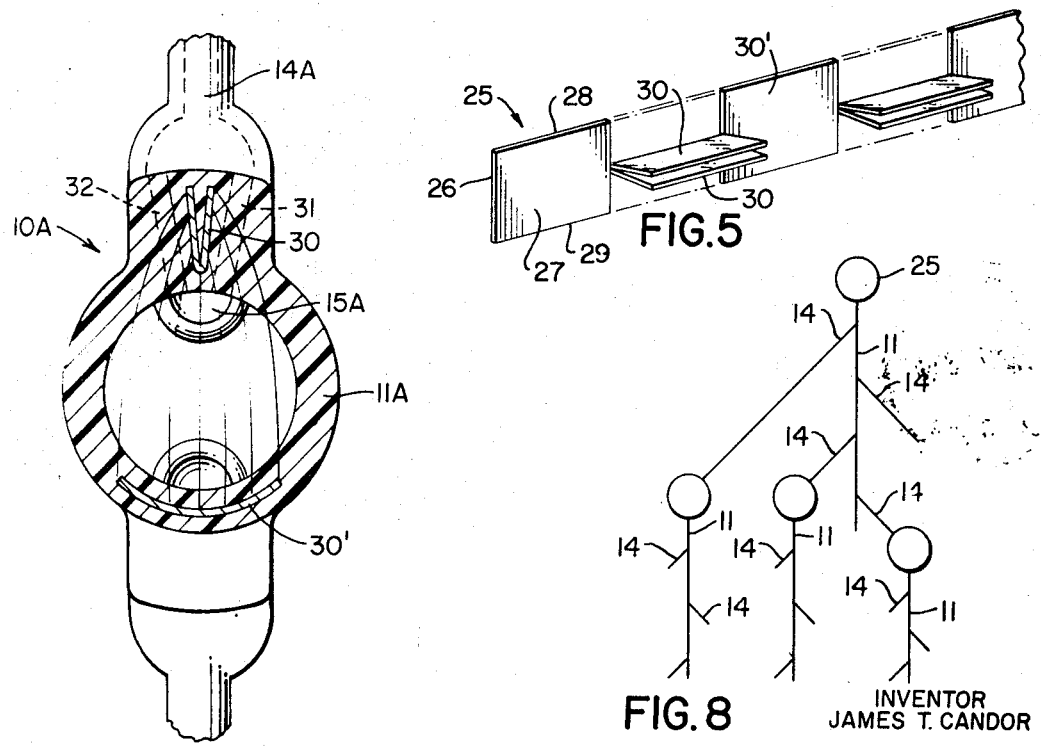

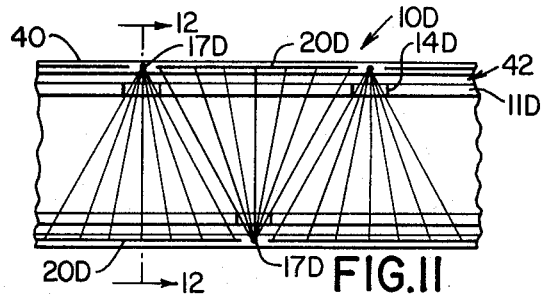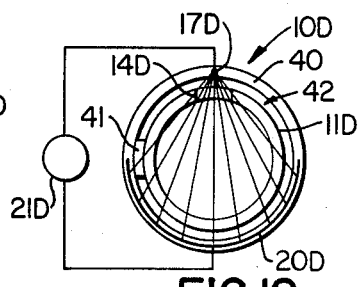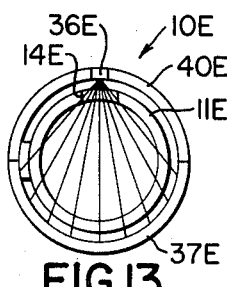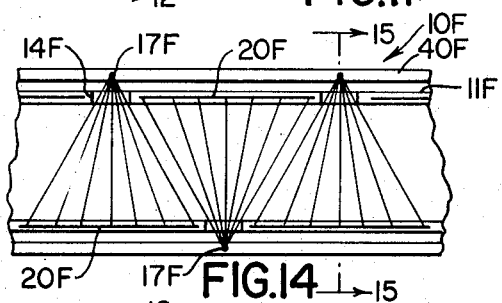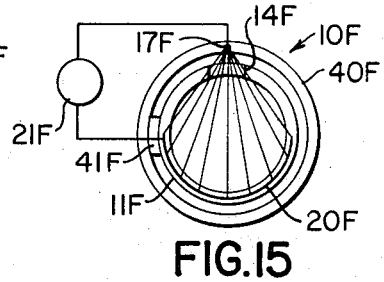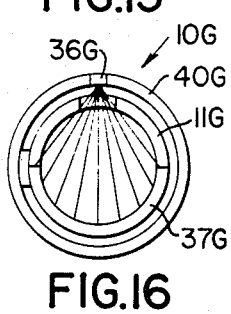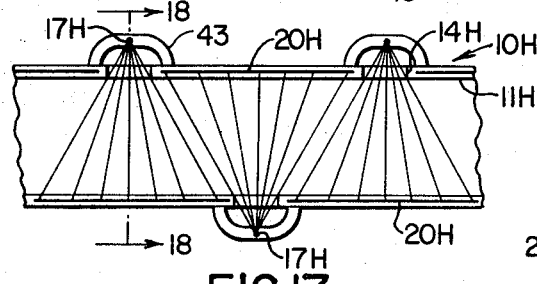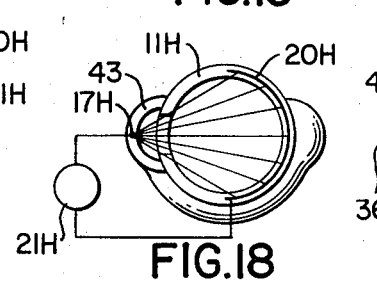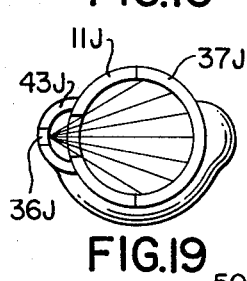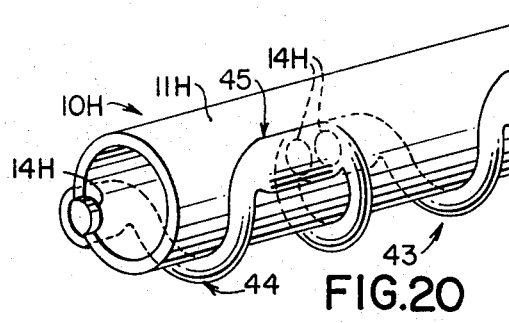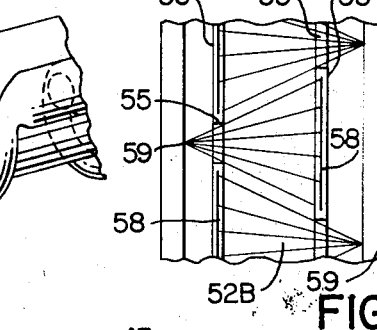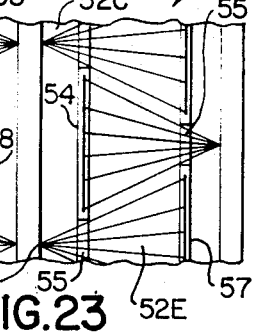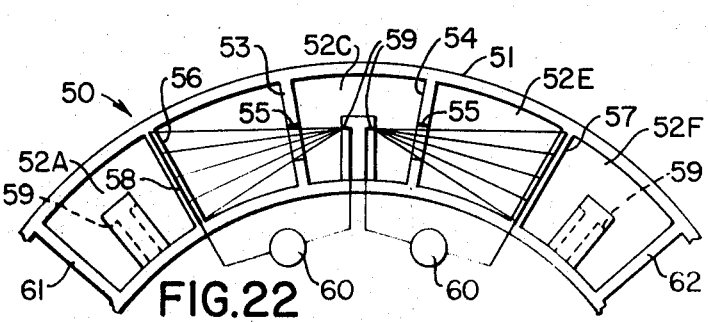

3,687,834
METHOD AND APPARATUS FOR REMOVING PARTICLES FROM FLUID CONTAINING THE SAME
James T. Candor, 5440 Cynthia Lane, Dayton, Ohio 45429
Continuation-in-part of application Ser. No. 864,851, Oct. 8, 1969, which is a continuation-in-part of application Ser. No. 811,421, Mar. 28, 1969. This application Apr. 6, 1970, Ser. No. 25,938
Int. Cl. B03c 5/00; C02b 1/78
U.S. Cl. 204—186       10 Claims

ABSTRACT OF THE DISCLOSURE

Method and apparatus having electrostatic means for removing particles from a fluid containing the same, the electrostatic means comprising charged electrode means electrically insulated from the fluid so that the electrostatic field thereof draws the particles into exit means of a passage defining means having the fluid moved therethrough. Such charged electrode means create a plurality of alternately arranged non-uniform fields across the fluid in the passage means so that the particles enter the exit means adjacent the more intense portions of the non-uniform fields, such electrodes being either externally charged or electrets. Such passage means can comprise means for straight laminar flow of the fluid therethrough by being adjacent or in another passage means having a particle receiving fluid stream flow therethrough.

This application is a continuation-in-part patent application of its copending parent patent application, Ser. No. 864,851, filed Oct. 8, 1969, which, in turn, is a continuation-in-part patent application of its copending parent patent application, Ser. No. 811,421, filed Mar. 28, 1969, now abandoned.

This invention relates to an improved apparatus and method for removing particles from a fluid containing the same.

A feature of this invention is to provide a method and apparatus for removing particles from a fluid containing the same, whether the fluid be gaseous or liquid.

In particular, one embodiment of this invention provides a passage defining means having inlet means and outlet means and an exit means intermediate the inlet and outlet means, means for directing the particle containing fluid into the inlet means, electrostatic means for attracting at least some of the particles toward the exit means solely by an electrostatic attraction thereof so that the attracted particles will pass out through the exit means, and means for removing the particle reduced fluid from the outlet means. The electrostatic means can comprise charged electrode means or electret means electrically insulated from the fluid so that the particles are attracted to the exit means solely by the electrostatic field force created by the electrode means whereby an electrical current is not passed through the fluid. If desired, the passage defining means can provide for laminar flow of the fluid therethrough while still causing the particles to pass out of the exit means thereof.

Accordingly, it is an object of this invention to provide an improved apparatus for separating particles and the like from a fluid containing the same, the apparatus of this invention having one or more of the novel features set forth above or hereinafter shown or described.

Another object of this invention is to provide an improved method for separating particles and the like from a fluid containing the same, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a fragmentary, cross-sectional view of the improved apparatus and method of this invention, FIG. 1 being taken substantially on line 1—1 of FIG. 2.

FIG. 2 is a cross-sectional view taken substantially on line 2—2 of FIG. 1.

FIG. 3 is a view similar to FIG. 1 and illustrates another embodiment of this invention.

FIG. 4 is a cross-sectional view taken substantially on line 4—4 of FIG. 3.

FIG. 5 is a fragmentary perspective view illustrating how each row of electrode means for the structure of FIGS. 3 and 4 can be formed from a single sheet of material.

FIG. 6 is a cross-sectional view similar to FIG. 4 and illustrates another embodiment of this invention.

FIG. 7 is a view similar to FIG. 5 and illustrates how each row of electrode means of the embodiment of FIG. 6 can be formed from a single sheet of material.

FIG. 8 is a schematic view illustrating the method of utilizing a plurality of passage defining means of this invention for serially removing particles from various branch flows of fluid.

FIG. 9 is an end view of a sheet of material for making a passage defining means of this invention.

FIG. 10 is a cross-sectional view similar to FIG. 6 and illustrates the use of the sheet of material of FIG. 9 in forming another embodiment of this invention.

FIG. 11 is a fragmentary, cross-sectional view similar to FIG. 1 and illustrates another embodiment of this invention.

FIG. 12 is a cross-sectional view taken on line 12—12 of FIG. 11 and is rotated 90°.

FIG. 13 is a view similar to FIG. 12 and illustrates another embodiment of this invention.

FIG. 14 is a view similar to FIG. 11 and illustrates another embodiment of this invention.

FIG. 15 is a cross-sectional view taken on line 15—15 of FIG. 14 and is rotated 90°.

FIG. 16 is a view similar to FIG. 15 and illustrates another embodiment of this invention.

FIG. 17 is a view similar to FIG. 11 and illustrates another embodiment of this invention.

FIG. 18 is a cross-sectional view taken on line 18—18 of FIG. 17 and is rotated 90°.

FIG. 19 is a view similar to FIG. 18 and illustrates another embodiment of this invention.

FIG. 20 is a fragmentary perspective view of the embodiment of FIG. 18 or FIG. 19.

FIG. 21 is a schematic plan view illustrating part of the passage means of the device illustrated in FIG. 20.

FIG. 22 is a fragmentary, cross-sectional view illustrating another embodiment of this invention.

FIG. 23 is a fragmentary top view of the embodiment illustrated in FIG. 22.

Referring now to FIGS. 1 and 2, the improved method and apparatus of this invention is generally indicated by the reference numeral 10 and comprises a tubular passage defining means 11 formed from electrically insulating material and having an inlet end or means 12 and an outlet end or means 13 with a plurality of exit means 14 intermediate the inlet means 12 and the outlet means 13 in a predetermined arrangement for a purpose hereinafter described.

For example, each exit means 14 can be formed integrally with the passage defining means 11 and has an opening 15 adjacent the internal peripheral surface 16 of the passage defining means 11, the exit means 14 being arranged into aligned rows 14A and 14B that are disposed parallel to each other and on opposite sides of the passage defining means 11 in a staggering relationship so that one of the exit means 14 in the lower row 14B illustrated in FIG. 1 is disposed substantially half-way between an adjacent pair of exit means 14 in the upper row 14a illustrated in FIG. 1.

Adjacent each exit means 14 on the upstream side thereof, a small electrode means 17 is disposed in the electrical insulating material 18 of the passage defining means 11 so as to be disposed out of electrical contact with any liquid that would be passing through the passage defining means 11, each electrode 17 being suitably shaped, such as being pointed or the like, to enhance the degree of electrostatic attraction by the resulting non-uniform field as will be apparent hereinafter. Diametrically opposite each small electrode 17 is a large electrode means 20 also disposed in the electrical insulating means 18 of the passage defining means 11 so as to be electrically insulated from any liquid passing through the passage defining means 11. As illustrated in the drawings, the large electrode means 20 is substantially semicircular as illustrated in FIG. 2 and is substantially bisected by its respective opposed small electrode 17.

In this manner, it can be seen that there are two rows 17A, 20A and 17B, 20B of electrode means 17 and 20 disposed in parallel aligned relation on opposite sides of the passage defining means 11.

Thus, in each row 17A, 20A or 17B, 20B of electrode means 17 and 20, a large electrode means 20 is interposed in spaced relation between each adjacent pair of small electrode means 17 of the same row thereof whereby each large electrode means 20 is disposed between each exit means 14 disposed in the same row therewith.

The electrode means 17 and 20 are adapted to be charged by an electrostatic means 21 illustrated in FIG. 2 wherein one potential of the electrostatic means 21 is interconnected by suitable lead means 22 to all of the electrode means 17 and 20 in the upper row 17A, 20A of electrodes and the opposite potential of the electrostatic means 21 is interconnected by lead means 23 to all of the electrode means 17 and 20 in the lower row 17B, 20B of electrode means for the passage defining means 11.

For example, when viewing FIG. 1, the electrostatic means 21 is adapted to charge the electrode means 17 and 20 in the lower row 17B, 20B with a positive potential and to charge the electrode means 17 and 20 in the upper row 17A, 20A with an opposite negative charge.

In this manner, non-uniform electric fields are created between each pair of opposed electrode means 17 and 20 with such non-uniform fields being indicated by the reference numeral 24 in FIGS. 1 and 2. The non-uniform electrostatic fields 24 are so arranged that the more intense portion of each electrostatic field 24 between each pair of opposed small and large electrode means 17 and 20 is adjacent to the opening 15 of an exit means 14 disposed adjacent the small electrode 17 of the particular electrostatic field 24.

In this manner, it is believed that when fluid is delivered into the inlet means of the passage defining means 11 by a directing means 25, each electrostatic field 24 operates on the particles thereof in such a manner that the positively charged particles as well as some of the neutral or uncharged particles are drawn to the negatively charged electrode means 17 and 20 in the upper row 17A, 20B of electrode means while the negatively charged particles as well as some of the neutral or uncharged particles are drawn toward the positively charged electrode means 17 and 20 in the lower row 17B, 20B of electrode means.

Because the more intense portion of each electrostatic field 24 is adjacent the opening 15 of a particular exit means 14, it can be seen that as the fluid passes from left to right in FIG. 1 through the passage defining means 11, the first left-hand electrostatic field 24 will tend to gather the positively charged particles, as well as some of the neutral particles and cause the same to move along the electrostatic field 24 toward the small electrode 17 adjacent the opening 15 of the first left-hand upper exit means 14 so that the same will pass out through the exit means 15 with a small portion of the fluid passing through the passage defining means 11 from left to right. Such first electrostatic field 24 while having a less intensive portion adjacent the first left end large electrode means 20, nevertheless, will tend to attract some of the negatively charged particles toward the lower portion of the passage defining means 11 so that when the same are conveyed further to the right by the means 25 passing the fluid through the passage defining means 11, the same will enter the more intense portion of the second left-hand electrostatic field 24 which is adjacent the inlet means 15 of the first lefthand lower exit means 14 so that the collected negatively charged particles as well as some of the neutral particles together with a small portion of the fluid passing through the passage defining means 11 will pass out through that particular exit means 14.

The second left-hand electrostatic field 24 likewise has the less intense portion thereof adjacent the large electrode 20 thereof but will still gather some of the positively charged particles that have passed the first exit means 14 toward the upper portion of the passage defining means 11 so that the same will enter the more intense portion of the electrostatic field 24 which is third from the left and is adjacent the opening 15 of the right hand upper exit means 14.

Thus, it can be seen that as the fluid passes from left to right in FIG. 1, portions of the positively charged particles as well as part of the neutral particles thereof are removed from the fluid out through the upper row 14A of exit means 14 while the negatively charged particles as well as some of the neutral particles are removed out through the bottom row 14B of exit means 14 and, depending upon the particle content of the fluid and the number of exit means 14, substantially particle free fluid will reach the outlet means 13 of the passage defining means 11 to be removed by a moving means 26.

Therefore, since the electrode means 17 and 20 of this invention are not disposed in electrical contact with the fluid passing through the passage defining means 11, no current flow or loss is created and the charged particles are merely moved toward the particular exit means 14 by the force of the non-uniform fields 24 in the manner previously described so that the only work required by the apparatus and method of this invention is the work required to force the fluid through the passage defining means 11.

However, it is well known that if the passage defining means 11 is tilted at an angle with its inlet means 12 being higher than its outlet means 13, gravity will provide for passing the liquid through the passage defining means 11 provided a sufficient head of liquid is provided at the inlet means 12 thereof.

Also, it is to be understood that while the passage defining means 11 has been illustrated and described as having an upper row 14A of exit means 14 and a lower row 14B of exit means 14, such exit means 14 can be provided on opposed sides of the passage defining means 11 in opposed relation rather than across the top and bottom of the passage defining means 11 as described and illustrated.

The flow of fluid from the fluid supply means 25 for the passage defining means 11 can be so controlled relative to the sizes of the exit means 14 and the fluid receiving means 26 that sufficient fluid can be supplied by the means 25 into the passage defining means 11 without requiring a stepped reduction in the cross-sectional dimension of the passage defining means 11 downstream from each exit means 14. For example, the exit means 14 can each have restriction means therein so as to limit the amount of fluid passing therethrough and the outlet means 13 could also have a restriction means therein to limit the amount of fluid passing through the outlet means 13 whereby the rate of flow through the conduit means 11 can be readily controlled in relation to the amount of fluid entering the inlet means 12 thereof, as desired.

While the various features of this invention have been described as providing the non-uniform electrostatic field means by having external means continuously charging the electrode means 17 and 20 in the manner previously described, it is to be understood that the permanent non-uniform electrostatic fields can be provided by utilizing suitably shaped permanent electrets, such as the electrets material fully set forth in the United States Patent No. 3,458,713 issued July 29, 1969.

In U.S. Patent No. 3,458,713 there is disclosed an electret material that can provide a high electric field of sensibly permanent duration and a full disclosure is provided as to how such electret material can be formed, the resulting electret being described as the electric analog of a permanent magnet.

It is believed that such electret material when formed in sheet form will have one polarity on one side thereof and an equal and opposite polarity on the other side thereof with such material permanently maintaining such polarity or charge for a long period of time, e.g., 10 years.

Therefore, it is one of the features of this continuation-in-part application to disclose how such electret material can be utilized to practice the features of this invention.

Accordingly, reference is now made to FIGS. 3, 4 and 5 of this invention wherein another method and apparatus of this invention is generally indicated by the reference numeral 10A and the parts thereof similar to the method and apparatus 10 of FIG. 1 are indicated by like reference letter A.

As illustrated in FIGS. 3 and 4, the method and apparatus 10A comprises a tubular passage defining means 11A having inlet means 12A and outlet means 13A to be respectively interconnected to the fluid feeding means 25 and removing means 26 in the manner previously described, the passage defining means 11A having a plurality of exit means 14A provided with entrances 15A in a manner similar to the passage defining means 11 of FIG. 1.

However, the electrode means for providing the non-uniform electrostatic fields across the passage defining means 11A with the more intense portions thereof respectively adjacent the entrance means 15 of the exit means 14A are formed from similar strips of electret material such as the electret strip 25 illustrated in FIG. 5. As illustrated in FIG. 5, the electret strip 25 has opposed surfaces 26 and 27 respectively provided with like opposed permanent charges in the manner fully set forth in the aforementioned Patent No. 3,458,713. Thereafter, the strip 25 is slit at its top and bottom edges 28 and 29 in the manner illustrated in FIG. 5 in an alternating fashion so that angled fins 30 can be formed therefrom in the manner illustrated in FIG. 5. The resulting electret strip 25 is embedded in the insulating material of the passage defining means 11A as illustrated in FIGS. 3 and 4 whereby each finned part 30, by being folded in the manner illustrated in FIG. 4, cooperates with the unfolded part 30' of an oppositely disposed strip 25 to provide a respective and permanent non-uniform electrostatic field with the more intense portion thereof adjacent a particular entrance means 15A of an exit means 14A.

Of course, the electret strip 25 utilized for the lower set of exit means 14A has the side thereof facing the upper electret strip 25 oppositely charged to the facing side of the upper electret strip so as to provide the non-uniform electrostatic fields in the manner previously described for the purposes previously described. In order to prevent the fluid passing through the pass defining means 11A from actually engaging the finned portions 30 of each electret strip 25 adjacent their respective exit means 14A, the entrance 15A of each exit means 14A is bifurcated around the particular finned portion 30 as illustrated by the passages 31 and 32 in FIG. 4 which rejoin on the other side of the particular finned portion 30. Thus, even the finned portions 30 are protected from direct contact with the fluid or other material being directed through the passage defining means 11A.

In this manner, since the electret material is forming permanent non-uniform electrostatic fields across the passage defining means 11A, the non-uniform electrostatic fields function in the manner previously described to remove the particles in the manner previously described.

Of course, the electret strip 25 can have the parts thereof forming the more intense portions of the electrostatic fields formed in other configurations as desired.

For example, reference is now made to FIGS. 6 and 7 wherein another method and apparatus of this invention is generally indicated by the reference numeral 10B and parts thereof similar to the apparatus 10A are indicated by like reference numerals followed by the reference letter B.

As illustrated in FIGS. 6 and 7, the slit portions of each electret strip 25A have been formed into cylindrical parts 33 to respectively cooperate with unformed parts 34 of the opposite strip 25A in the manner illustrated in FIG. 6 to provide the permanent non-uniform electrostatic fields across the passage defining means 11B with the more intense portions thereof being adjacent the entrances 15B of the exit means 14B.

Should it be found that the electret material can be of the type which will not be readily attacked by the particle containing fluid actually engaging the same or have the life or the permanency of its charge changed in an adverse manner, the electret material itself could form the passage defining means.

For example, reference is now made to FIGS. 9 and 10 wherein another method and apparatus of this invention is generally indicated by the reference numeral 10C and parts similar to the means 10 previously described are indicated by like reference numerals followed by the reference letter C.

As illustrated in FIG. 9, a single strip of material 35 that can be formed with a permanent charge is only charged in the areas 36 and 37 thereof in the manner as set forth in the aforementioned Pat. No. 3,458,713 except that each part 36 has its upper side with a positive charge and its lower side with a negative charge while each part 37 has its upper side with a negative charge and the lower side thereof with a positive charge. In addition, each charged area 37 is greater than its cooperating area 36 except that each area 36 has a permanent charge greater per square inch thereof than the charge per square inch on the cooperating area 37 thereof so that when the strip 35 is subsequently formed into the tubular form as illustrated in FIG. 10, each two charged areas 36 and 37 cooperate together to define a non-uniform field across the passage defining means 10C with the more intense portion thereof being adjacent an entrance means 15C of an exit means 14C for the purpose previously described.

Therefore, by taking the strip of material 35 and selectively and permanently forming the same into electret areas throughout the length thereof so that when the same is subsequently formed into tubular form, a plurality of permanent non-uniform electrostatic fields can be provided in an alternating manner across the tubular structure of 11C in much the same manner as the non-uniform fields provided by the charged electrodes 17 and 20 of FIG. 1 and the electret strips 25 in the embodiment of FIG. 3.

Also, it is to be understood that it may be found that when utilizing the electret feature of this invention, the larger electrode of each cooperating pair of electrets can have a greater or lesser charge per square inch thereof than the charge per square inch of the smaller electrode portion cooperating therewith to provide the desired results for removing the contaminants from the liquid passing through the particular passage defining means.

Therefore, it can be seen that this invention provides an improved method and apparatus for removing particles from a fluid or the like carrying the same by electrostatic means which comprises charged electrode means or electret means electrically insulated from the fluid or the like that is passed through the passage defining means or arranged so as to be free from adverse effects of the fluid.

While the various passage defining means of this invention have been illustrated with each exit means thereof merely expelling its fluid, it is to be understood that each exit means could be the source for feeding fluid into a new passage defining means constructed in the same manner as the upstream passage defining means.

For example, reference is made to FIG. 8 where such a network of passage defining means 11 of this invention are interconnected together whereby various concentrates, etc., can be collected at desired points downstream thereof.

While the various passage defining means of this invention previously described have each been provided with projections 15 extending into the fluid passage 16 to provide means for exiting the attracted particles out of the exit means 14 in the manner previously described, it may be found that such projections 15 provide too much turbulence for a desired fluid flow rate through the passage defining means. If so, then a true laminar flow means can be provided for the fluid with the particle removing features of this invention being substantially the same.

For example, reference is now made to FIGS. 11 and 12 wherein another method and apparatus of this invention is generally indicated by the reference numeral 10D with parts thereof similar to the other methods and apparatus of this invention being indicated by like reference numerals followed by the reference letter D.

As illustrated in FIGS. 11 and 12, a first passage defining means 11D is mounted concentrically within an outer passage defining means 40 while being supported therein by a support means 41 in the manner illustrated in FIG. 12 to provide a space or passage 42 between the conduits or passage defining means 11D and 40. The inner passage defining means 11D has openings or exit means 14D passing therethrough in an alternating manner along diametrically opposed rows as illustrated in FIG. 11 while the outer tubular member 50 carries a plurality of smaller electrode means 17D and large electrode means 20D in a manner similar to the electrode means 17 and 20 of FIG. 1 so as to cooperate together to provide alternating non-uniform electrostatic fields across the passage defining means 11D with the fields respectively having the more intense portions thereof passing through the exit means 14D as illustrated in FIGS. 11 and 12.

Thus, since all of the electrode means 17D and 20D in the upper row thereof are of a like charge while the small and large electrode means 17D and 20D in the bottom row thereof in FIG. 11 are of a like and of an opposite polarity from the upper row, particles of one charge will be attracted out through the upper exit means 14D while particles of the opposite polarity will be directed out of the lower exit means 14D in the same manner as provided by the apparatus 10 of FIG. 1 except that the entire fluid flow through the inner conduit means 11D is a true laminar flow thereof and the flow between the conduits 11D and 40 is also a true laminar flow so that the oppositely attracted particles being received in the space 42 between the conduits 11D and 40 will mix to complement each other whereby there will be no particle travel back through the exit means 14D into the inner conduit means 11D.

Thus, it can be seen that the apparatus 10D provides for true laminar flow through the inner conduit means 11D while still utilizing the principles of alternating non-uniform electrostatic fields for the purpose previously described.

Also, instead of having externally charged small and large electrode means 17D and 20D, the alternating non-uniform electrostatic field arrangement of FIGS. 11 and 12 can be provided by a permanent electret structure previously described by forming the outer conduit 10 of electret material in substantially the same manner as provided by the material 35 in FIGS. 9 and 10. Alternately, such electret material can be imbedded into insulating material forming the outer conduit 40, if desired.

For example, reference is now made to FIG. 13 wherein another embodiment of this invention is generally indicated by the reference numeral 10E and parts thereof similar to the apparatus 10D are indicated by like reference numerals followed by the reference letter E.

As illustrated in FIG. 13, the outer conduit means 40E has an upper row of alternating small and large electrodes 36E and 37E in a manner similar to the sheet 35 so that alternating non-uniform electrostatic fields can be provided between the large and small electrode means 36E and 37E so that the more intensive portion thereof will be passing through an opening means 14E in the inner conduit 11E to produce the non-uniform electrostatic field effect as illustrated in FIG. 11.

Referring now to FIGS. 14 and 15, another embodiment of this invention is generally indicated by the reference numeral 10F and parts thereof similar to the apparatus 10D of FIG. 11 will be indicated by like reference numerals followed by the reference letter F.

As illustrated in FIGS. 14 and 15, the outer conduit means 40F carries the small electrode means 17F while the inner conduit means 11F carries the large electrode means 20F that cooperate therewith to provide the alternating, non-uniform electrostatic fields respectively having the intense portions thereof passing through opening means 14F in the inner conduit means 11F to provide the non-uniform electrostatic field effect illustrated in FIGS. 14 and 15 for the purpose previously described. The external charging means 21F can charge the large electrode means 20F through the supporting arrangement 41F between the inner and outer conduits 11F and 10F in the manner illustrated in FIG. 15.

As illustrated in FIG. 16, the electrode arrangement of the embodiment 10F of FIGS. 14 and 15 can be provided by the embodiment 10G wherein the outer conduit 40G is provided with the small electrets 36G while the inner conduit 11G is provided with the large electret areas 37G to provide the alternating non-uniform electrostatic field arrangement similar to the field arrangement illustrated in FIGS. 14 and 15.

Therefore, it can be seen that in the embodiments illustrated in FIGS. 11–16, a laminar flow of the liquid or fluid passing through the inner conduit means is provided as a laminar flow of liquid or fluid is also being provided in the space between the inner and outer conduits so that there is no disturbance in the fluid flow even though the particles are being moved into the space between the two conduits by the alternating non-uniform electrostatic field patterns previously described.

Should it be desired to provide the laminar flow previously described through the inner conduit without providing a completely surrounding outer conduit means as provided in the embodiments 11–16 for receiving the removed contaminants, another embodiment of this invention can be utilized and is generally indicated by the reference numeral 10H with parts thereof similar to apparatus 10D being indicated by like reference numerals followed by the reference letter H.

As illustrated in FIGS. 17 and 18, a main conduit means 11H is provided with the same carrying a plurality of large electrode means 20H which respectively cooperate with smaller electrode means 17H respectively being carried by an outer tubular conduit means 43 snaking about and being secured to the conduit means 11H in the manner illustrated in FIGS. 17, 18 and 20 so that the small electrode means 17H being carried by the outer conduit means 43 will be opposite an opening 14H in the main conduit 11H and cooperate with a large electrode 20H with the intense portion of the resulting field passing through the respective opening 14H.

Since the fluid flow in the outer winding conduit 23 must travel a greater distance between adjacent exit means 14H than the distance the fluid in the inner conduit means 11H must travel, the passage defining means 43 can be suitably inwardly necked at areas 44 between enlarged portions 45 thereof as illustrated in FIGS. 20 and 21 so as to speed up the flow of fluid therethrough because the large portion 45 thereof will be adjacent the exit means 14H, the enlarged portion 45 slowing down the fluid flow therethrough so as to be of the same speed as the speed of flow of the fluid passing through the larger conduit means 11H.

In this manner, as an upper small electrode means 17H of the embodiment 10H of FIG. 17 attracts its particular charged particles into the passage means 43 through the upper exit 14H, such charged particles are brought down to the next exit means 14H in the lower row of electrode means so as to be combined with the oppositely charged particle being brought into the passage defining means 43 by the lower electrode means 17H so as to tend to neutralize the particle content in the passage defining means 43 whereby there will be no attempt for such particles therein to reenter the main conduit means 11H through the passage means 14H.

Another embodiment for providing true laminar flow of the liquid or fluid having the particles removed therefrom is generally indicated by the reference numeral 50 in FIGS. 22 and 23 and comprises a housing means 51 having a plurality of compartments or passage means 52A, 52B, 52C, 52E, 52F, etc. circularly arranged throughout the length thereof whereby the particles in passages 52B and 52E are respectively removed either into the intervening passage means 52C or into the outboard passage means 52A and 52F as will be apparent hereinafter.

The walls 53 and 54 between the compartments 52B, 52C, 52E have exit means 55 passing therethrough in a manner similar to the exit means 14B previously described while the walls 56 and 57 respectively between the compartments 52A, 52B and 52E, 52F likewise have exit means 55 passing therethrough as illustrated in FIG. 23 so as to cooperate with large and small electrode means 58 and 59 similar to the electrode means 17 and 20 in producing alternating non-uniform electrostatic fields across the passage means 52B and 52E as illustrated in FIG. 23 for alternately removing the particles thereof out through the exits 55 so that charged particles of one polarity from the compartment 52B entering the compartment 52C will be joined by oppositely charged particles from the compartment 52B entering the compartment 52C. This feature is provided by having the external charging means 60 charging small electrodes 59 that operate on the exits 55 of the wall 53 with a charge opposite from the charge on the small electrodes 59 which operate on the exit means 55 in the wall 54.

Similarly the particles being drawn into the compartment 52A from the compartment 52B through the exits 55 and in the wall 56 will be combined with oppositely charged particles also being drawn into the chamber 52A from the next adjacent passage means on the other side of the wall 61 in the manner previously described. Likewise the compartment 52F is drawing particles of one polarity through the exit means from the compartment 52E through the exit means 55 of the wall 57 into the compartment 52F to be combined with oppositely charged ions being drawn from the compartment on the other side of the wall 62 in the manner previously described.

Therefore, it can be seen that the embodiment 50 of this invention permits alternating chambers in a circular arrangement of such chambers to be progressively decontaminated while every other passage therethrough has the concentration of particles therein increased, the entire fluid flow through the various passages of the embodiment 50 being true laminar flow arrangements.

In regard to FIG. 19, it can be seen that the arrangement provided therein is substantially the same as FIGS. 17 and 18 except that the large electrodes comprise electret areas 37J carried by the main passage defining means 11J and that the small electrodes comprise electret areas 36J carried by the small winding outer passage means 43J.

Thus, while it is believed that the embodiments of FIGS. 1–10 will remove particles by the alternating non-uniform electrostatic field arrangements previously described even though the exit means 14 have projections 15 extending into the main flow streams, the various features of this invention could be utilized with true laminar flow of the fluids having the contaminants removed therefrom as provided by the embodiments illustrated in FIGS. 11–23.

However, it is also to be understood that various other embodiments can be provided that will still utilize the features of this invention and that this invention is not to be limited to the particular configurations or embodiments illustrated as the passage defining means can have other cross sectional configurations as desired.

What is claimed is:

1. Apparatus for separating particles from a fluid carrying the same comprising a first passage defining means having inlet means and outlet means and having exit means intermediate said inlet and outlet means, other passage defining means disposed substantially on opposite sides of said first passage defining means and being in fluid communication with said exit means, means for directing said fluid into said inlet means to flow from said inlet means to said outlet means with substantially a laminar flow, electrostatic means for attracting at least some of said particles toward said exit means solely by an electrostatic attraction thereof so that said attracted particles will pass out through said exit means into said other passage defining means without disturbing said laminar flow through said first passage defining means, said electrostatic means comprising electrode means providing a plurality of alternately arranged non-uniform electrostatic fields respectively extending across said first passage defining means and acting on said particles of said fluid, each non-uniform field having its higher intensity portion substantially oppositely located relative to the higher intensity portion of the next adjacent non-uniform field, and means for removing said fluid from said outlet means.

2. Apparatus as set forth in claim 1 wherein said higher intensity portions of said fields respectively are adjacent said exit means.

3. Apparatus as set forth in claim 1 wherein said electrode means for each non-uniform electrostatic field comprises two spaced apart electrodes being oppositely charged.

4. Apparatus as set forth in claim 3 wherein said electrode means comprises a plurality of pairs of two such spaced apart electrodes disposed substantially in aligned relation with each pair of electrodes creating its non-uniform field with its higher intensity portion oppositely located relative to the higher intensity portion of an adjacent non-uniform field.

5. Apparatus as set forth in claim 4 wherein said aligned pairs of electrodes define two rows of electrodes respectively disposed along said other passage defining means with each electrode in the same row having a like charge thereon facing said fluid in said first passage defining means.

6. A method for separating particles from a fluid carrying the same comprising the steps of directing said fluid through an inlet means of a substantially laminar flow producing first passage defining means having an outlet means and exit means intermediate said inlet and outlet means thereof, disposing other passage defining means substantially on opposite sides of said first passage defining means so as to be in fluid communication with said exit means, electrostatically attracting at least some of said particles toward said exit means solely by an electrostatic attraction thereof for electrode means providing a plurality of alternately arranged non-uniform electrostatic fields respectively extending across said first passage defining means and acting on said particles of said fluid with each non-uniform field having its higher intensity portion substantially oppositely located relative to the higher intensity portion of the next adjacent non-uniform field so that said attracted particles will pass out through said exit means into said other passage defining means without disturbing said laminar flow through said first passage defining means, and removing said fluid from said outlet means.

7. A method as set forth in claim 6 wherein said step of electrostatically attracting at least some of said particles toward said exit means comprises the step of creating said non-uniform electrostatic fields with said higher intensity portions of said fields respectively being disposed adjacent said exit means.

8. A method as set forth in claim 6 wherein said step of providing each of said non-uniform electrostatic fields comprises the step of disposing two spaced apart electrodes on substantially opposite sides of said first passage defining mean with the two electrodes being oppositely charged.

9. A method as set forth in claim 8 wherein said step of disposing said two spaced apart electrodes comprises the steps of disposing a plurality of pairs of two such spaced apart electrodes substantially in aligned relation so as to act across said first passage defining means with each pair of electrodes creating its non-uniform field with the higher intensity portion thereof being oppositely located relative to the higher intensity portion of an adjacent non-uniform field.

10. A method as set forth in claim 9 wherein said step of disposing said aligned pairs of electrodes comprises the step of disposing said aligned pairs of electrodes in two rows of electrodes respectively along said other passage defining means with each electrode in the same row having a like charge thereon.

References Cited
UNITED STATES PATENTS

| | | | |
|---|---|---|---|
| 2,555,487 | 6/1951 | Haugaard et al. | 204—180 R |
| 3,207,684 | 9/1965 | Dotts, Jr. | 204—180 R |
| 3,287,244 | 11/1966 | Mel | 204—180 R |
| 3,304,251 | 2/1967 | Walker et al. | 204—184 |
| 3,320,148 | 5/1967 | Skeggs | 204—180 R |
| 3,448,026 | 6/1969 | Benner | 204—180 R |
| 3,478,494 | 11/1969 | Lustenader et al. | 55—127 |
| 3,496,701 | 2/1970 | Owe Berg | 55—6 |
| 3,162,592 | 12/1964 | Pohl | 204—186 |
| 2,279,583 | 4/1942 | Slayter | 55—6 X |
| 3,431,441 | 3/1969 | Shair | 55—2 X |
| 3,487,610 | 1/1970 | Brown et al. | 55—130 |

OTHER REFERENCES

Ellis: "Fresh Water From The Ocean," TD 430 E 49 C.2 (1954), pp. 41–43, 56–59.

Moore: "Physical Chem.," 3rd ed. (1965), Prentice-Hall, pp. 335, 345, 351, 357.

Walker: "Intro. to Phys. Chem.," QD 453 W 3 (1913), pp. 242, 243, 247.

Nernst: "Theoretical Chem.," QD 453 N43TE (1895), p. 321.

Robinson et al.: "Electrolyte Solutions," 2nd ed., QD 561, R6 (1959) p. 118.

GERALD L. KAPLAN, Primary Examiner

A. C. PRESCOTT, Assistant Examiner

U.S. Cl. X.R.

204—180 R, 299; 55—2